UNITED STATES PATENT OFFICE.

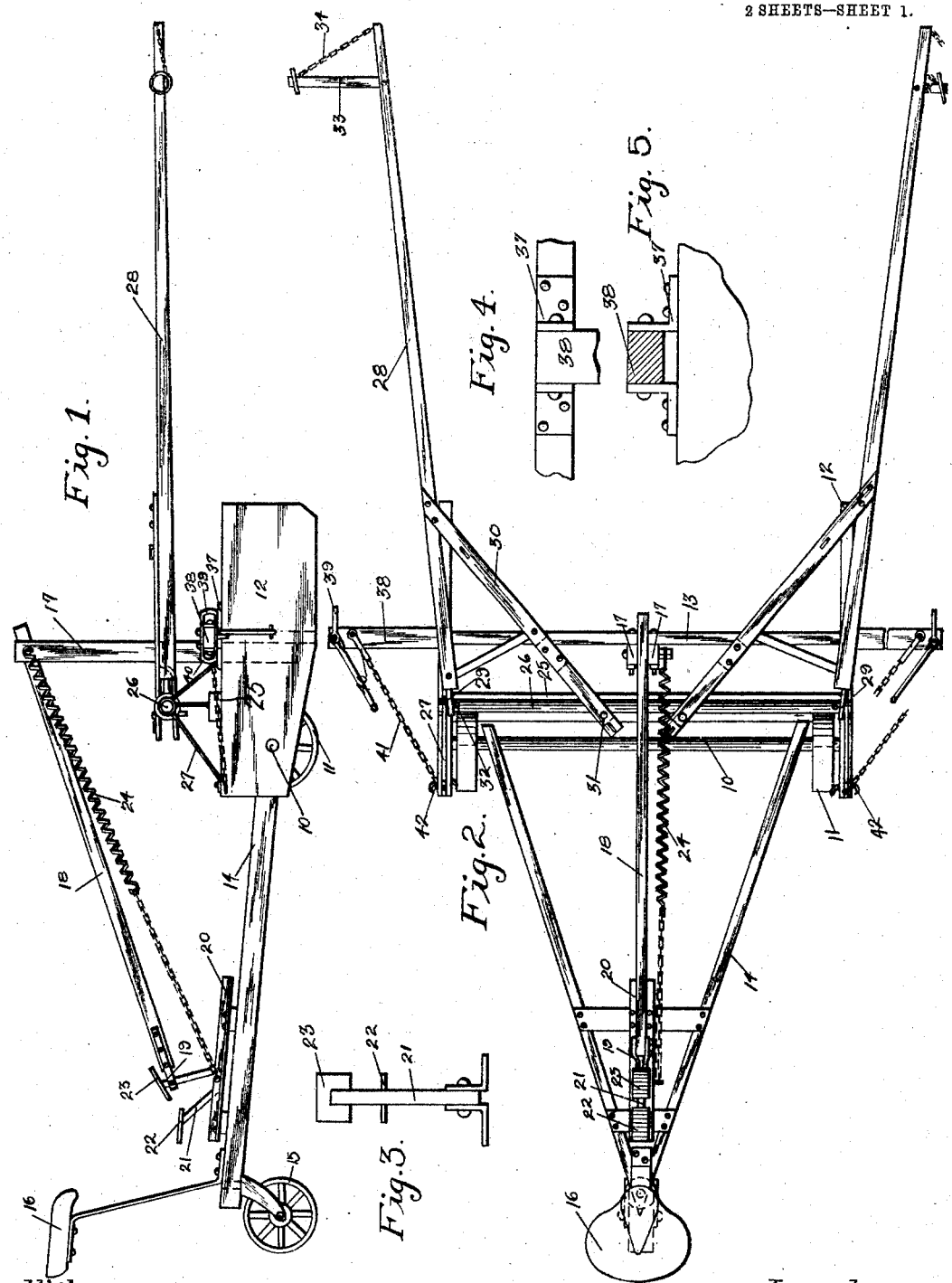

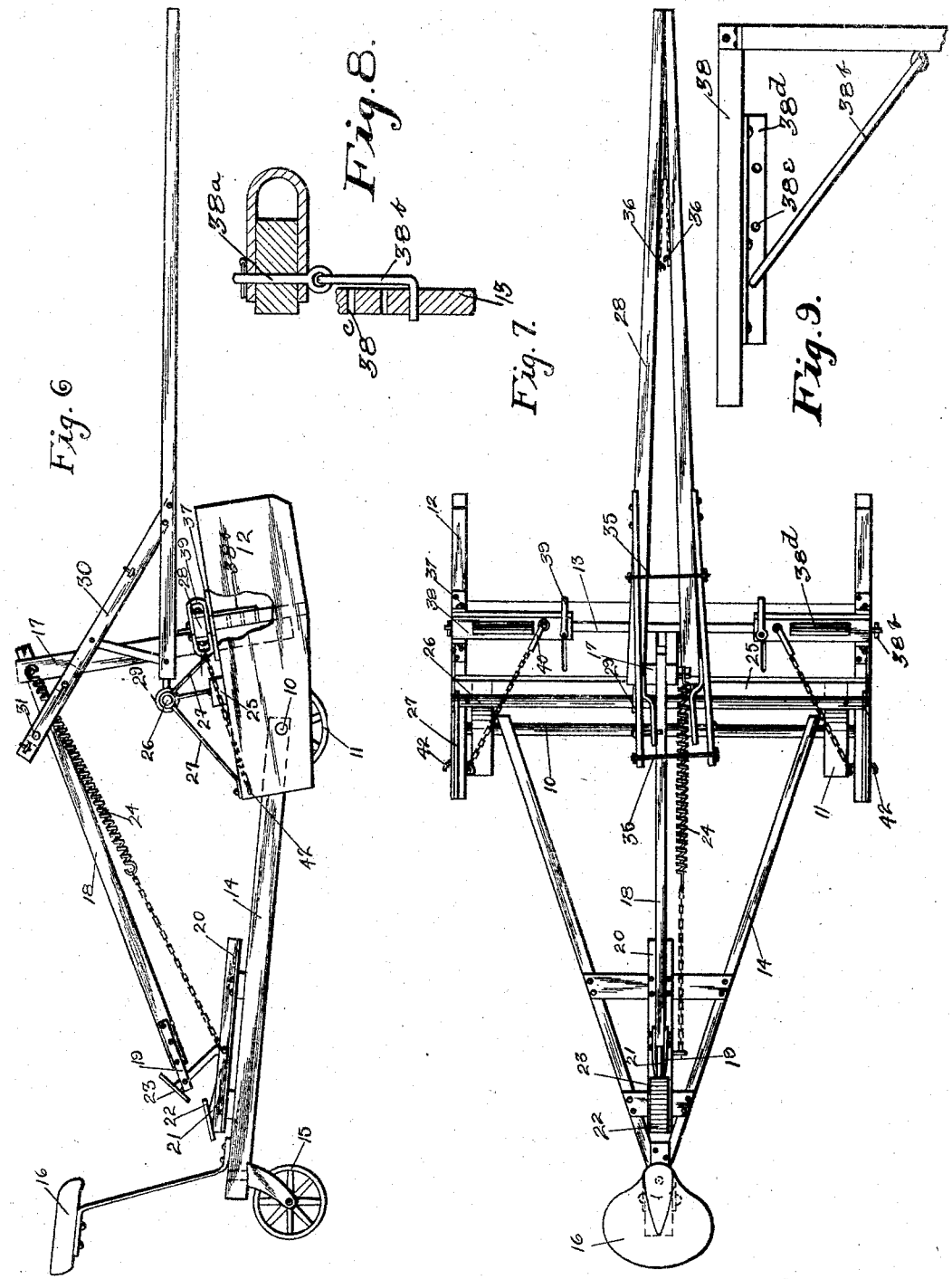

CORNELIUS DIELEMAN, WIEGERT D. RIETVELD, AND JOHN D. RIETVELD, OF PELLA, IOWA.

MANURE-SCRAPER.

No. 928,186.       Specification of Letters Patent.       Patented July 13, 1909.

Application filed August 10, 1908. Serial No. 447,898.

*To all whom it may concern:*

Be it known that we, CORNELIUS DIELEMAN, WIEGERT D. RIETVELD, and JOHN D. RIETVELD, citizens of the United States, residing at Pella, in the county of Marion and State of Iowa, have invented a certain new and useful Manure-Scraper, of which the following is a specification.

The object of our invention is to provide a wheeled scraper of simple, durable and inexpensive construction, designed to be advanced by draft animals, and so arranged that it will scrape up manure or other material resting upon the ground surface and conduct it to a point of discharge.

A further object is to provide simple and easily operated means whereby the operator may either hold the scraper blade to the ground or elevate it above the ground as may be desired.

A further object is to provide means whereby the two draft animals that are ordinarily used for advancing the scraper may be made to advance on opposite sides of the scraper or may be made to advance directly in front of the scraper, so that the sides of the scraper may be advanced close to a fence or other obstruction.

More specifically, it is our object to provide an improved double tongue for devices of this kind in which the portions of the tongue may be supported at opposite sides of the device and each be designed to have a draft animal attached to it, or the two portions of the tongue may be brought together in front of the center of the device and the draft animals attached to it in the same manner as they would be to a single vehicle tongue.

Our invention consists in the construction, arrangement and combination of the various parts of the device, whereby the objects contemplated are attained, as hereinafter more fully set forth, pointed out in our claims, and illustrated in the accompanying drawings, in which—

Figure 1 shows a side elevation of a device embodying our invention with the scraper blade in its lowered position and the tongue sections attached to the outer sides of the scraper. Fig. 2 is a top or plan view of same. Fig. 3 shows a rear end elevation, on an enlarged scale of the foot lever device for raising and lowering the scraper blade. Fig. 4 shows a top or plan view of the pivoted swingle-tree. Fig. 5 shows a sectional view of same looking toward the hinged end. Fig. 6 shows a side elevation of the complete device embodying our invention with the scraper blade in its elevated position and the tongue sections brought together and secured to the center of the device. Fig. 7 is a top or plan view of same. Fig. 8 shows an enlarged, detail sectional view illustrating the means for supporting the swingle-tree holding arm when at its inward limit of movement, and—Fig. 9 shows a detail view illustrating the means for supporting the swingle-tree holding arm when at its outer limit of movement.

Referring to the accompanying drawings, we have used the reference numeral 10 to indicate the supporting axle upon which the wheels 11 are mounted. This axle is passed through the side-boards 12, the forward portions of which have their lower ends arranged so that they may rest flat upon the ground surface over which the wheels are traveling, and the rear ends are inclined upwardly and rearwardly. At about the central portion of the side boards 12, is a scraper blade 13 extended vertically and fixed to the side-boards.

Extended rearwardly from the axle 10 is a V-shaped frame 14 having an axle wheel 15 at its rear end for supporting it, and above the axle wheel is a driver's seat 16.

Fixed to the central portion of the scraper blade 13 are two parallel uprights 17 and pivoted between them is a bar 18 extended rearwardly and downwardly and provided with a loop 19 at its rear end.

Supported between the sides of the frame 14 is a bar 20 having pivoted to it a substantially U-shaped lever 21 provided with two treadles 22 and 23, the latter treadle having the loop 19 attached to it. By this arrangement it is obvious that when the operator presses forwardly upon the treadle 23, the side-boards 12 will be moved to position with their lower ends parallel with the ground surface as shown in Fig. 1, and when the operator presses downwardly upon the treadle 21, the side-boards are tilted upwardly as shown in Fig. 6.

In order to counter-balance the weight of the forward end of the scraper, we provide a contractible coil spring 24 attached to one of the uprights 17 and extended rearwardly and downwardly and attached to the frame 20, the said spring being of such resilience that when the side-boards 12 are tilted to the position shown in Fig. 6, it will maintain them in said position until the treadle 23 is moved forwardly by the operator.

Mounted upon the side-boards 12, is a cross piece 25 in front of and above the axle 10, and above this cross piece is a rod 26 supported by the braces 27. This rod is for the purpose of supporting the tongues. Ordinarily, we prefer to use an independent tongue for each draft animal, which tongue extends forwardly and outwardly from the runner. Each tongue comprises a straight body portion 28 having a loop 29 at its rear end, mounted upon the rod 26, said loop being pivotally mounted on the tongue. Fixed to the rear portion of the tongue is a brace 30 extended rearwardly and inwardly and having a forked rear end to encircle the central portion of the rod 26. A bolt 31 is provided for connecting the forked end with the rod 26, and a pin 32 is passed through the rod 26 to limit the inward movement of the loop 29 on the rod. In this way, each tongue is firmly and securely held in a position inclined forwardly and outwardly from the runner. Pivoted to the forward portion of the tongue is an arm 33 extended outwardly and held in position by means of a chain 34, which chain is detachably connected with the forward end of the tongue.

In some instances it is desirable to provide for advancing the machine by means of a tongue in the center of the machine, and when this is done, we remove the bolts 31 from both braces and also the pins 32. We then slide the loops 29 toward the center of the rod 26 as shown in Fig. 7, the braces 30 will then project upwardly and rearwardly. In order to hold the rear ends of the tongues together, we provide two rods 35 having hooks at their ends to over-lap the braces 30. The arms 33 at the forward ends of the tongues are then moved rearwardly and the chains 34 are detached from the front of the tongue and connected with the hooks 36 on the tongues.

When the tongues are used at the ends of the scraper blade, it is necessary to have an arm projecting out from the scraper for attaching a swingle-tree, and when the tongues are at the center, it is necessary to have a swingle-tree supported between the side-boards and the center. In order to provide a single device for this purpose, we have attached to the upper edge of each scraper a pair of brackets 37, and between each pair of brackets an arm 38 is pivoted. On the outer end of this arm is a clevis 39 to receive a swingle-tree, and also a clevis 40 extended rearwardly to which a chain 41 is attached. This chain is detachably connected with a hook or bolt 42 at the rear of the side-board. In Fig. 2, the arms 38 are shown extended outwardly and in Fig. 7, they are shown extended inwardly. At the free end of the arm 38 is a pin 38$^a$ to which a hook 38$^b$ is pivoted and in the scraper-blade 13 is a series of openings 38$^c$ designed to receive the hook 38$^b$ and thus support the arm 38 in various positions of adjustment. On one side of the arm 38 is an angle bar 38$^d$ having a number of openings 38$^e$ therein, and pivoted to the scraper-blade is a hook 38$^f$ designed to enter the openings 38$^e$. In this way the arm 38 may be supported at different elevations at its outer limit of movement.

In practical use and assuming that it is desired to use the device with the tongues at the outer sides of the scraper, we attach a draft animal to each tongue in the ordinary way. If it is desired to transport the device from place to place without scraping, the operator presses downwardly upon the lever 22 thus elevating the forward ends of the side-boards and also elevating the scraper blade above the ground surface. Then the machine may be advanced to the point desired for use. Then the operator presses forwardly upon the treadle 23 and thus throws the scraper blade to position adjacent to the ground. When the draft animals advance the scraper, manure or other material resting upon the ground surface will be scraped up by it and will be confined between the forward ends of the side-boards, and a large quantity of such material may be carried to the point of discharge.

By the use of a scraper blade of this kind, the ground surface is left smooth and even after the scraper has passed over it.

When it is desired to use the device to scrape up material close to a fence or other obstruction, then the tongues are connected with the center of the device as before described, and the swingle-tree supporting arms are swung inwardly as shown in Figs. 6 and 7, then the draft animals are attached to opposite sides of the tongue in the ordinary manner.

We claim as our invention.

1. In a device of the class described, the combination of two side members, a scraper blade between them, supporting wheels for the side members, a frame pivoted to the side members and extended rearwardly, a supporting wheel at the rear end of said frame, an upright secured to the scraper blade, a bar pivoted to the upright, a substantially U-shaped lever pivoted to the frame near its rear end and having said bar attached thereto, and a treadle on each end of said lever.

2. In a device of the class described, the combination of two side members, a scraper blade between them, supporting wheels for the side members, a frame pivoted to the side members and extended rearwardly, a supporting wheel at the rear end of said frame, an upright secured to the scraper blade, a bar pivoted to the upright, a substantially U-shaped lever pivoted to the frame near its rear end and having said bar attached thereto, and a treadle on each end of said lever, and a spring attached to said upright and to said frame.

3. In a device of the class described, the combination with a scraper of two independent tongues detachably fixed to opposite sides of the scraper, said tongues being provided with means for connecting both of them to the central portion of the scraper.

4. In a device of the class described, the combination with a scraper of two independent tongues detachably fixed to opposite sides of the scraper, said tongues being provided with means for connecting both of them to the central portion of the scraper, and means for holding said tongues together when arranged at the central portion of the scraper.

5. In a device of the class described, the combination with a scraper of a rod extended transversely of the scraper, two independent tongues, each having a loop pivoted to its rear end and slidably mounted on the rod, each also having a brace fixed to its rear end portion and adjustably attached near the central portion of the rod, said parts being so arranged that the braces may be detached from the rods and the tongues moved rearwardly toward the center of the rod, and turned to such position that the braces will extend upwardly and the tongues will lie adjacent to each other.

6. In a device of the class described, the combination with a scraper of two tongues, said tongues being capable of attachment to the ends of the scraper, and also to the central portion thereof, and a swingle-tree supporting arm for each side of the scraper pivoted to swing from position extended outwardly from the end of the scraper to position projected inwardly toward the center of the scraper.

7. In a device of the class described, the combination with a scraper of a rod extended transversely of the scraper, two tongues, each having a loop pivoted to its rear end, said loop being mounted on the rod, a brace fixed near the rear end of the tongue and extended rearwardly and inwardly and having a forked rear end to receive the said rod, a bolt extended through said forked rear end to hold the brace to the rod, and said tongues being so arranged that they may be moved toward the center of the rod and turned to position with the braces extending upwardly, means for connecting the tongues with each other at the center of the scraper, and a swingle-tree supporting arm at each end of the scraper pivoted to swing from an outwardly to an inwardly extended position, and a brace chain attached to the outer end of the arm and detachably connected with the scraper in the rear of the arm.

Des Moines, Iowa, May 16, 1908.

CORNELIUS DIELEMAN.
  WIEGERT D. RIETVELD.
  JOHN D. RIETVELD.

Witnesses:
  W. G. VANDER PLOEG,
  W. H. VANDERPLOEG.